United States Patent Office 3,428,992
Patented Feb. 25, 1969

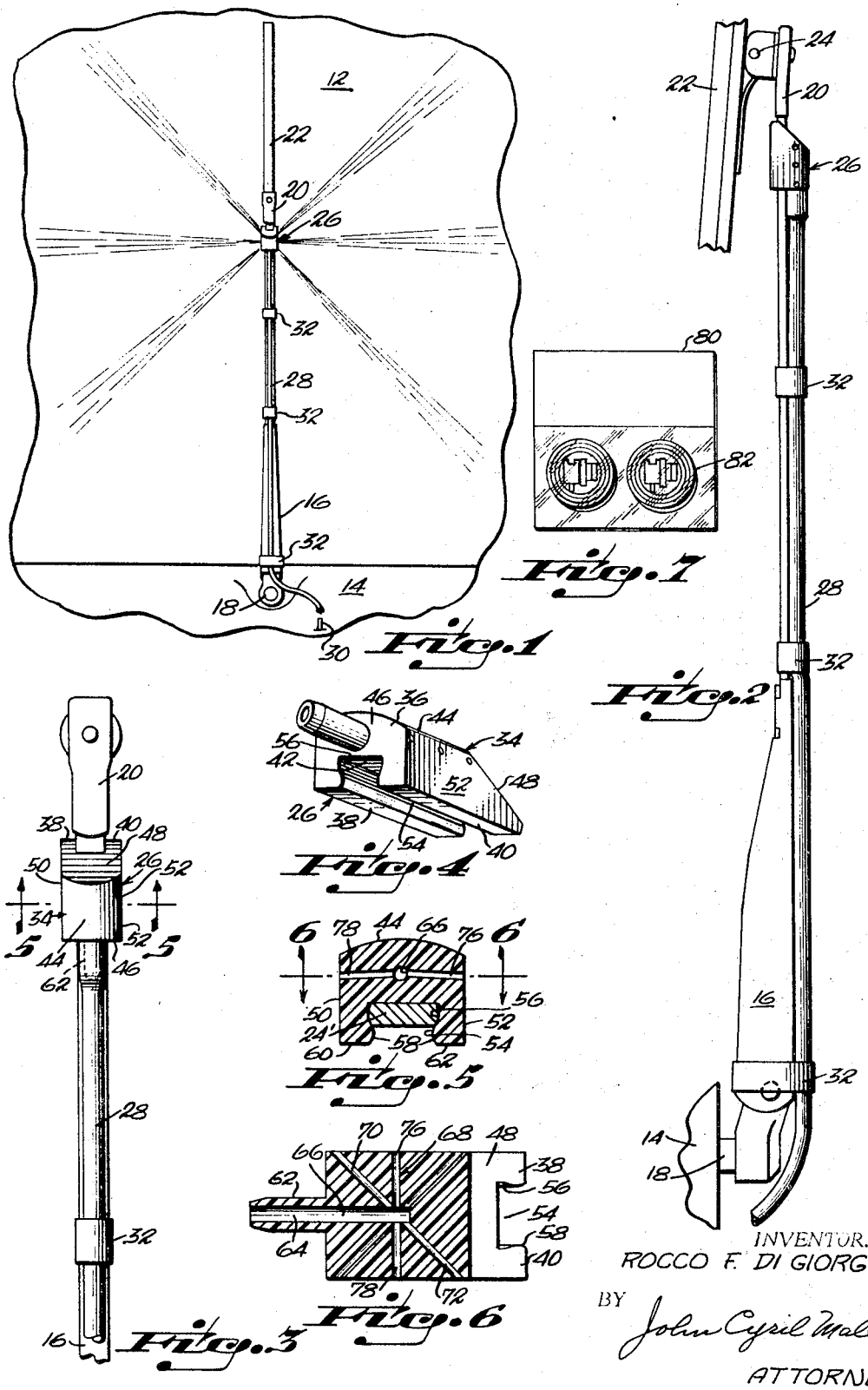

3,428,992
ADAPTER FOR WINDSHIELD WIPER
Rocco F. Di Giorgio, Miami, Fla., assignor to
Progressive Research Corporation, Miami, Fla.
Filed Mar. 8, 1967, Ser. No. 621,543
U.S. Cl. 15—250.04                              7 Claims
Int. Cl. A47l 1/02; B60s 1/02

ABSTRACT OF THE DISCLOSURE

A head and tube to connect along the arm of a windshield wiper blade assembly to carry water from the conventional vehicle spray head to a distribution point at about the blade connection, the head having a network of passageways to distribute the water in a generally symmetrical pattern over the area wiped by the wiper blade.

In the past, there have been numerous devices which are employed for the purpose of squirting water on a windshield to be distributed by the wiper blade.

The invention relates to an improved means for conducting water to the windshield and provides for a distribution head to be connected for swinging movement with the wiper blade and conduit means to connect the head to the water supply and to ride with the swinging movement of the arm, said head having a network of passageways arranged to conduct the water and distribute it into a generally symmetrical pattern over the area being wiped by the wiper blade on swinging movement of the arm.

It is, accordingly, an object of this invention to provide an improved wiper blade and wiper blade arm assembly which provides an adapter to be removably connected thereto for conducting water to be sprayed on the windshield to clean it in combination with the wiper blade.

In accordance with these and other objects which will become apparent hereinafter, the instant invention will now be described with reference to the accompanying drawing illustrating a preferred embodiment thereof.

In the drawings:

FIGURE 1 is a partial view of this invention installed on the wiper blade and arm assembly;

FIGURE 2 is a partial side elevation view of FIGURE 1;

FIGURE 3 is an enlarged front view of the assembly shown in FIGURE 1;

FIGURE 4 is a perspective view of the spray head of the instant invention;

FIGURE 5 is a view in cross section taken along the plane indicated by the line 5—5 of FIGURE 3 and looking in the direction of the arrows and illustrating the cross-sectional area of the spray head and distal end portion of the swinging arm;

FIGURE 6 is a view in cross section of the spray head of FIGURE 5 taken along the plane indicated by the line 6—6 of FIGURE 5 and looking in the direction of the arrows;

FIGURE 7 is a view illustrating the packaging of the instant invention.

Referring to the drawings where like reference characters designate like or corresponding parts throughout the different figures and referring particularly to FIGURE 1, there is shown the environment for this invention which comprises the windshield 12 of the vehicle above the base 14 across the front of the vehicle to which there is an arm 16 pivotally connected as at 18 which carries on the portion 20 thereof a wiper blade 22 which is connected thereto by pivot means 24. As can be seen in FIGURE 2, the instant invention comprises generally, as will be described more fully hereinafter, a spray head 26 which, by means of a length of conduit 28 is connected to a spray head 30, the conduit being mounted to ride with the swinging movement of the arm by means of loop means such as the bands indicated by the numeral 32.

Referring more in detail to the head 26, it will be seen that this comprises (see FIGURE 4), a body 34 having a trunk portion 36 and opposing legs 38 and 40 extending or depending from the lower side 42 which is beneath the upper surface 44 and which also includes opposing end faces 46 and 48 and side faces 50 and 52. It will be seen that a recess 54 extends longitudinally of the lower side 42 of the trunk and that this recess is of a cross-sectional area having a main inner portion 56 and an outer or throat portion 58 of reduced cross-sectional area bounded by the distal ends 60 and 62 of said legs 40 and 42. The inner portion of the recess, which extends from the end faces completely across the body, is sized the same as the cross-sectional area of the distal end portion 24' of arm 16 (seen in cross-section in FIGURE 5) to adapt the spray head to nest or dwell on the distal end portion of the swinging arm 16. The spray head is of resilient material whereby the legs are adapted to be moved upwardly so that the throat will expand and permit entrance of the distal end portion of the swingable arm to nest in the interior recessed portion. It will be seen that the proximal end face of the spray head is provided with a stud 62 having a bore 64 which communicates with a main line channel 66 of a network 68 which is composed of a plurality of passageways such as that designated by the numerals 70 and 72 which fan out in a generally radial pattern as seen in plan in FIGURE 6 to the terminal which comprise ports 76 and 78 at the side faces of the head. The stud comprises a portion of mutually interengaging means to connect the outer end of the conduit length to the head, the said stud being receivable in tight engagement in the tubular end of the conduit to snugly hold therein, the tubular length is preferably of transparent and radially yieldable, flexible material. The length is of a distance sufficient to extend from the distal end portion of the arm to the proximal portion plus that increment which is required to connect to the conventional spray head 30 on a vehicle sprinkler. It will be understood that the spray head 30 is a schematic illustration and is merely to indicate the source of the fluid to be traveled to the spray head, it being recognized that there are variations in design of the automobile spray tube. The tube or conduit is adapted to connect to the spray head by reason of the radially expansionable quality of the material, which is preferably plastic. Also, an adapter or other means may be provided to connect the device to the vehicle water supply system. It is preferred that the spray head will have a metal-like appearance so that it will be unnoticeable when installed on a vehicle.

In operation, water will be carried through the spray head and then distributed with the swinging movement of the arm over the area which is wiped by the carried wiper blade. It will be apparent that the flexible material of the conduit length permits the movement of the arm. The preferred material for the tubular length is plastic material of the type known as polyvinyl. Also, it will be realized that the tubular length of conduit should be of the type which may be readily cut so that in use this device may be packaged in pairs, each pair being composed of spray head, a length of the tubular material circumposed about the spray head in coil form, and a plurality of the loop means all lying relatively flat on a backing board 80 with said loop means being circumposed thereabout to hold the sets of the pair in a predetermined packaged position on the board enveloped by a plastic blister 82.

While the instant invention has been shown and described herein in what is conceived to be the most practical and preferred embodiment, it is recognized that departures may be made therefrom within the scope of the invention, which is therefore not to be limited to the details disclosed herein but is to be according the full scope of the claims so as to embrace any and all equivalent apparatus and articles.

What is claimed is:
1. In combination, for a vehicle, having
   (a) an arm swingably connected at the base of said vehicle windshield and said arm having a wiper blade connected thereto to ride with said arm to clean the windshield,
   (b) means on the arm to connect the blade and the arm, and
   (c) a windshield washer system having an outlet,
the improvement comprising, an adapter device to conduct and distribute liquid from the outlet to the distal end portion of the swinging arm which comprises:
   (1) a tubular conduit having a first end and a second flexible end, said conduit being of a length to extend the distance from the distal end portion to the base and from said base to said outlet of said washer system, said length being sized to overlay the distance on the arm,
   (2) a head,
   (3) means to connect the head to the first end of said conduit,
   (4) means to fasten the head to the distal end portion of said swingable arm,
   (5) said head comprising a body to ride with the arm in swinging movement, said body having an upper face, and opposing end and side faces, said top face and one of said end faces being continuous and closed,
   (6) said body having an interconnected network including a main line of a first diameter and an interconnected plurality of passageways having a diameter less than that of said main line, each of said passageways extending to one of said side faces of the body and each terminating at an exit port located at spaced points on said body faces and said passageways defining a pattern of distribution for water as the network is seen in plan,
   (7) mutually interengaging means on said first end of the conduit and the body to interconnect the conduit and the network,
   (8) loop means to embrace said arm and said conduit to hold said conduit on the arm, said loop means being connected at spaced points along said arm,
   (9) said second end of said length of conduit being adapted to be connected to said washer system outlet, wherein
   (10) said body includes a trunk and spaced legs extending from the lower face of the trunk defining a longitudinally extending recess between the legs across the lower trunk face, said recess having a cross-sectional area with a main interior portion companionately shaped and sized to mate with the cross-sectional area of the distal end portion of the arm and an outer throat portion of a reduced area relative to said companionately shaped and sized area, said throat area being defined by the distal ends of said legs, said legs being adapted to be resiliently flexed outwardly to permit passage of the blade cross-sectional area into nesting relation in the main interior portion of the recess to ride with the arm in swinging movement and resist forces of removal and to frictionally hold the head in a predetermined position on said arm.

2. The combination as set forth in claim 1 wherein said loop means comprises a loop of elastic material.

3. The combination as set forth in claim 1 wherein the closed end face of said body is tapered to merge and blend with the main surface of the distal end portion of said arm.

4. The combination as set forth in claim 1 wherein said head has an exterior metal-like appearing surface.

5. The combination as set forth in claim 1 wherein said length is of transparent plastic material.

6. The combination as set forth in claim 1 wherein said network comprises a plurality of six passageways extending from the main center line of the body transversely from the main line and having three exit ports spaced equidistant from one another on each side face of said trunk.

7. The combination as set forth in claim 1 wherein said adapters, each being disposed upon a board and with the tubular length of said conduit being circumposed in a cylindrical form with said head and said loop means being within said form and a transparent plastic blister envelope to hold each of said adapters in side-by-side relation on said board.

References Cited

UNITED STATES PATENTS

| | | | |
|---|---|---|---|
| 2,367,426 | 1/1945 | Patterson | 15—250.01 XR |
| 2,866,996 | 1/1959 | Krusche | 15—250.04 |
| 3,008,170 | 11/1961 | Marks | 15—250.04 |
| 3,238,555 | 3/1966 | Cels | 15—250.04 |

FOREIGN PATENTS

| | | |
|---|---|---|
| 1,228,171 | 3/1960 | France. |
| 1,294,338 | 4/1962 | France. |
| 1,307,974 | 9/1962 | France. |
| 798,526 | 7/1923 | Great Britain. |

PETER FELDMAN, *Primary Examiner.*